United States Patent [19]
Tanaka et al.

[11] Patent Number: 5,610,941
[45] Date of Patent: Mar. 11, 1997

[54] IC CARD RADIO MODEM

[75] Inventors: Masahiko Tanaka; Kohei Nishiyama, both of Tokyo, Japan

[73] Assignee: NEC Corporation, Japan

[21] Appl. No.: 513,725

[22] Filed: Aug. 11, 1995

[30] Foreign Application Priority Data

Aug. 12, 1994 [JP] Japan .................................. 6-211839

[51] Int. Cl.$^6$ ...................................................... H04B 1/38
[52] U.S. Cl. ................................................. 375/222; 379/98
[58] Field of Search ..................................... 375/220, 222, 375/257; 379/90, 93, 98

[56] References Cited

U.S. PATENT DOCUMENTS 4,981,371  1/1991  Gurak et al. ........................ 379/96 X

FOREIGN PATENT DOCUMENTS

| | | |
|---|---|---|
| 0195290 | 9/1986 | European Pat. Off. . |
| 0473297 | 3/1992 | European Pat. Off. . |
| 0629071 | 12/1994 | European Pat. Off. . |
| 64-60049 | 3/1989 | Japan . |
| 2285558 | 7/1995 | United Kingdom . |
| WO94/21058 | 9/1994 | WIPO . |
| WO94/29968 | 12/1994 | WIPO . |

*Primary Examiner*—Stephen Chin
*Assistant Examiner*—Kevin Kim
*Attorney, Agent, or Firm*—Scully, Scott, Murphy & Presser

[57] ABSTRACT

In a radio modem for a personal computer or similar data terminal, an interface section is made up of a plurality of different communication interface circuits. One of the interface circuits is selected which matches a data terminal as to communication access conditions. The interface circuit selected is connected to a radio modem section also included in the modem. With this configuration, the modem is connectable to various kinds of data terminals each having particular access conditions.

3 Claims, 4 Drawing Sheets

Fig. 4

| ADDRESS | ATTRIBUTE |
|---|---|
| 0 0 | |
| 0 2 | |
| 0 4 | |
| * * | INTERFACE CIRCUIT 30-1 |
| * * + 2 | INTERFACE DESCRIPTION |
| * * + 4 | FUNCTION SELECTION |
| * * + 6 | POWER SOURCE CONDITION, TIMING |
| * * + 8 | I/O ADDRESS |
| # # | INTERFACE CIRCUIT 30-n |
| # # + 2 | INTERFACE DESCRIPTION |
| # # + 4 | FUNCTION SELECTION |
| # # + 6 | POWER SOURCE CONDITION, TIMING |
| # # + 8 | I/O ADDRESS |

IC CARD RADIO MODEM

BACKGROUND OF THE INVENTION

The present invention relates to a radio modem for modulating and demodulating data to be interchanged between remote data terminals and, more particularly, to a radio modem implemented as an IC (Integrated Circuit) card.

A conventional IC card radio modem for the above application has a communication interface circuit. When the radio modem is connected to a personal computer or similar data terminal matching it as to communication access conditions, it allows the data terminal to interchange data with a remote data terminal. Usually, the type of an IC for controlling a serial port differs from one data terminal to another data terminal. Hence, the communication access conditions of the conventional radio modem match only a single kind of data terminals. This brings about a problem that the radio modem does not allow two or more different kinds of data terminals to communicate, i.e., it is applicable only to, for example, PC-AT based data terminals.

In today's sophisticated business environments, there is an increasing demand for mobile computing services which allow computing resources to be accessed from data terminals located at destinations. For example, mobile computing allows a person to access a data base or similar computing resource by using a data terminal located at a client's office. However, with the conventional IC card radio modem, the person cannot operate the data terminal for communication unless the data terminal matches the radio modem. Therefore, the radio modem cannot meet the demand for "communication at any time and any place" services.

Japanese Patent Laid-Open Publication No. 64-60049 discloses a system in which a plurality of different modems are built in a local switch, and one of them matching the modem of a maintenance company is automatically selected. However, this system is not practicable without resorting to a local switch and a plurality of modems which increase the cost.

SUMMARY OF THE INVENTION

It is, therefore, an object of the present invention to provide an IC card radio modem connectable to various kinds of data terminals.

A radio modem for allowing data to be interchanged between remote data terminals of the present invention has an interface section connected to a first data terminal and having a plurality of communication interface circuits each having particular communication access conditions. A radio modem section is selectively connectable to any one of the communication interface circuits, and selectively modulates or demodulates data to be interchanged between the first data terminal and a second data terminal. A control section selects one of the communication interface circuits matching the first data terminal in communication access condition, and connects the communication interface circuit selected to the radio modem section.

BRIEF DESCRIPTION OF THE DRAWINGS

The above and other objects, features and advantages of the present invention will become more apparent from the following detailed description taken with the accompanying drawings in which:

FIG. 4 is a table listing attribute data stored in a CIS (Card Information Structure) circuit included in the embodiment.

DESCRIPTION OF THE PREFERRED EMBODIMENT

Figure 1:
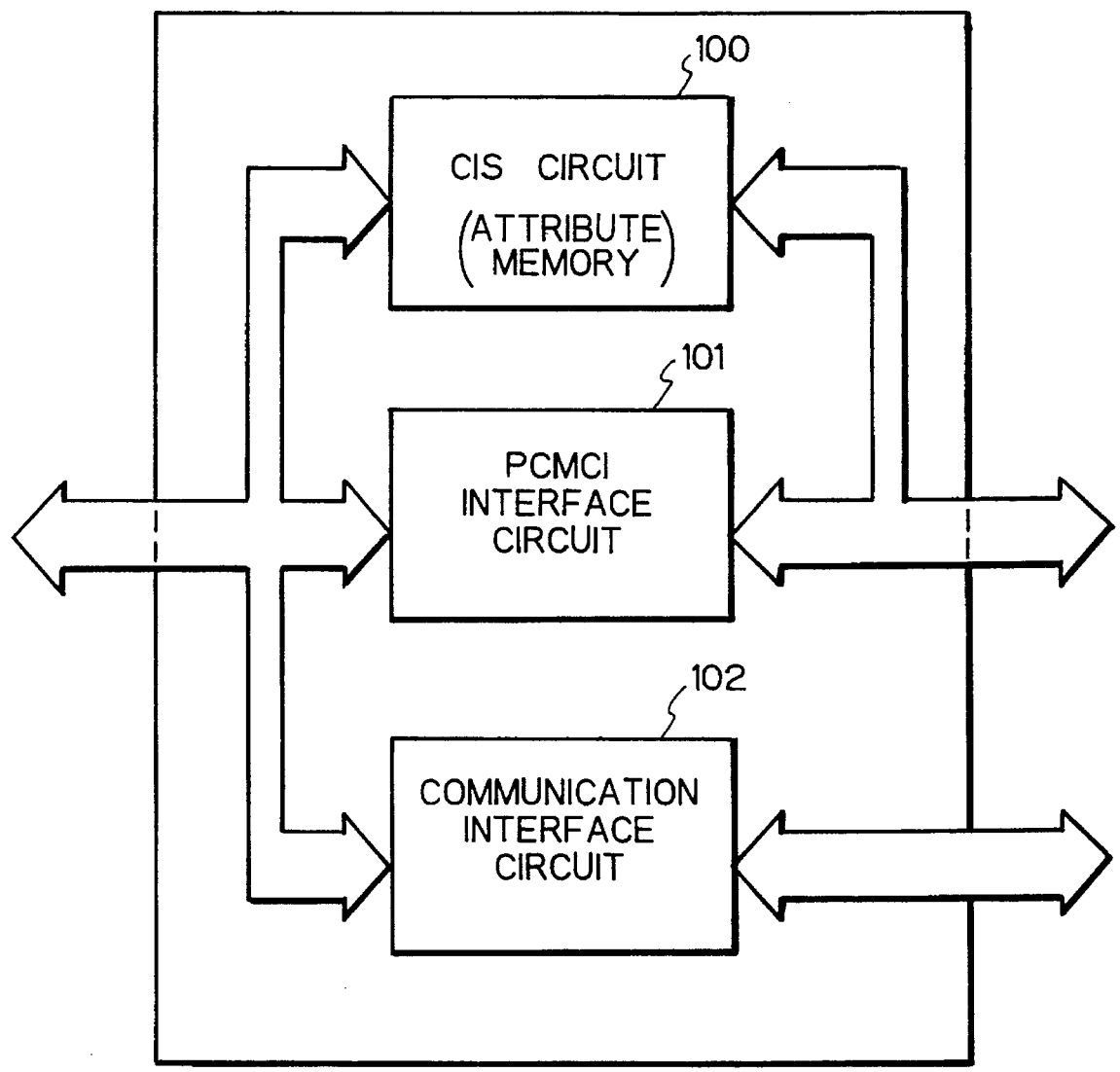
FIG. 1 is a block diagram schematically showing an interface section included in a conventional IC card radio modem.

To better understand the present invention, a brief reference will be made to a conventional IC card radio modem, particularly an interface section thereof, shown in FIG. 1. As shown, the interface section has a CIS circuit 100, a PCMCIA (Personal Computer Memory Card International Association) interface circuit 101, and a communication interface circuit 102. The CIS circuit 100 is an attribute memory storing data representative of the functions, performance and other attributes of the IC card. The PCMCIA interface circuit 101 has various kinds of registers based on a PCMCIA interface. The communication interface circuit 102 interchanges communication data with a personal computer or similar data terminal to which the IC card is mounted. The problem with the conventional IC card radio modem is that the communication access conditions of the communication interface circuit 102 match only a single kind of data terminals, as discussed earlier. That is, the radio modem does not allow two or more different kinds of data terminals to communicate.

Figure 2:
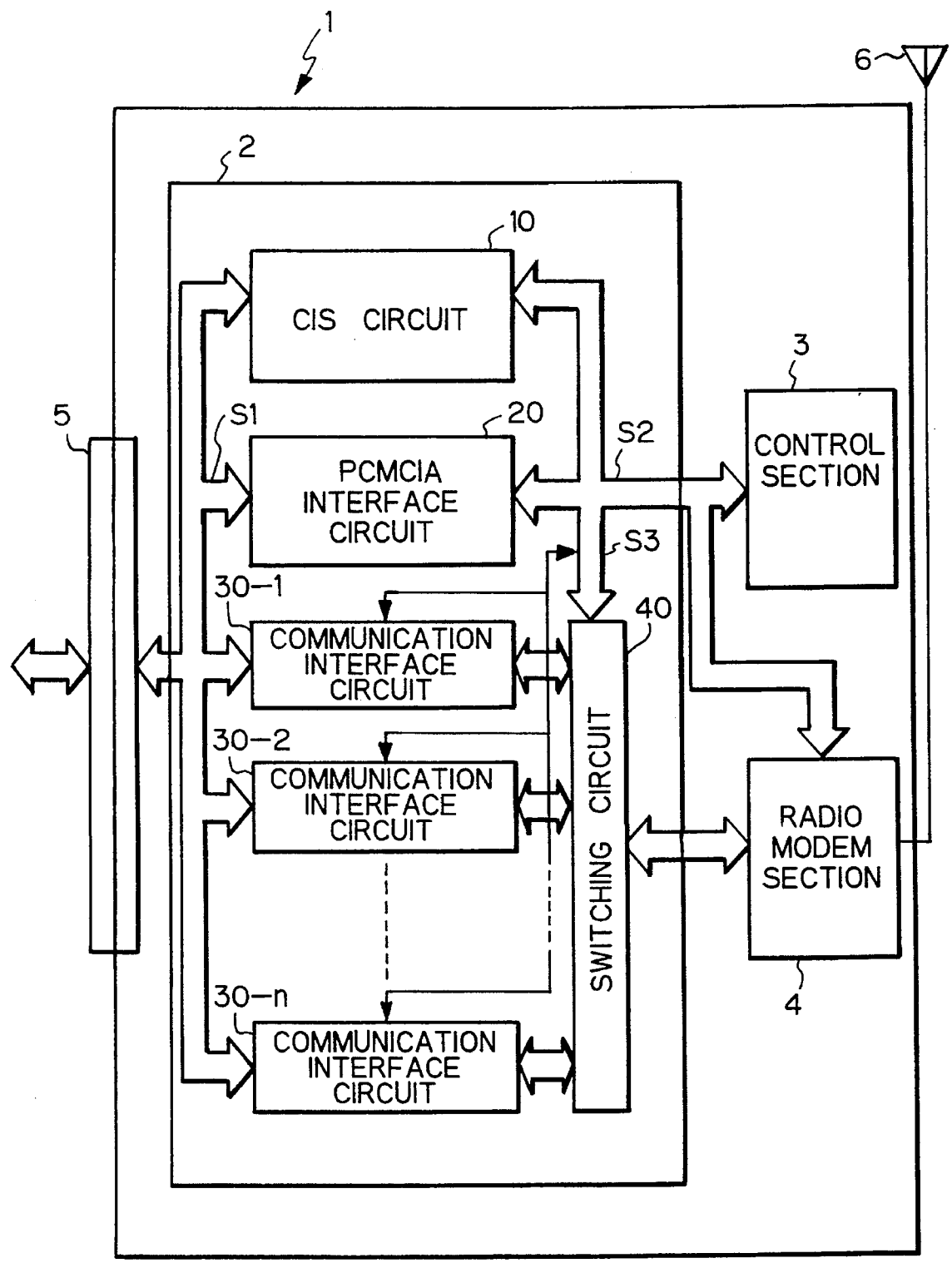
FIG. 2 is a block diagram schematically showing an IC card radio modem embodying the present invention.
Figure 3:
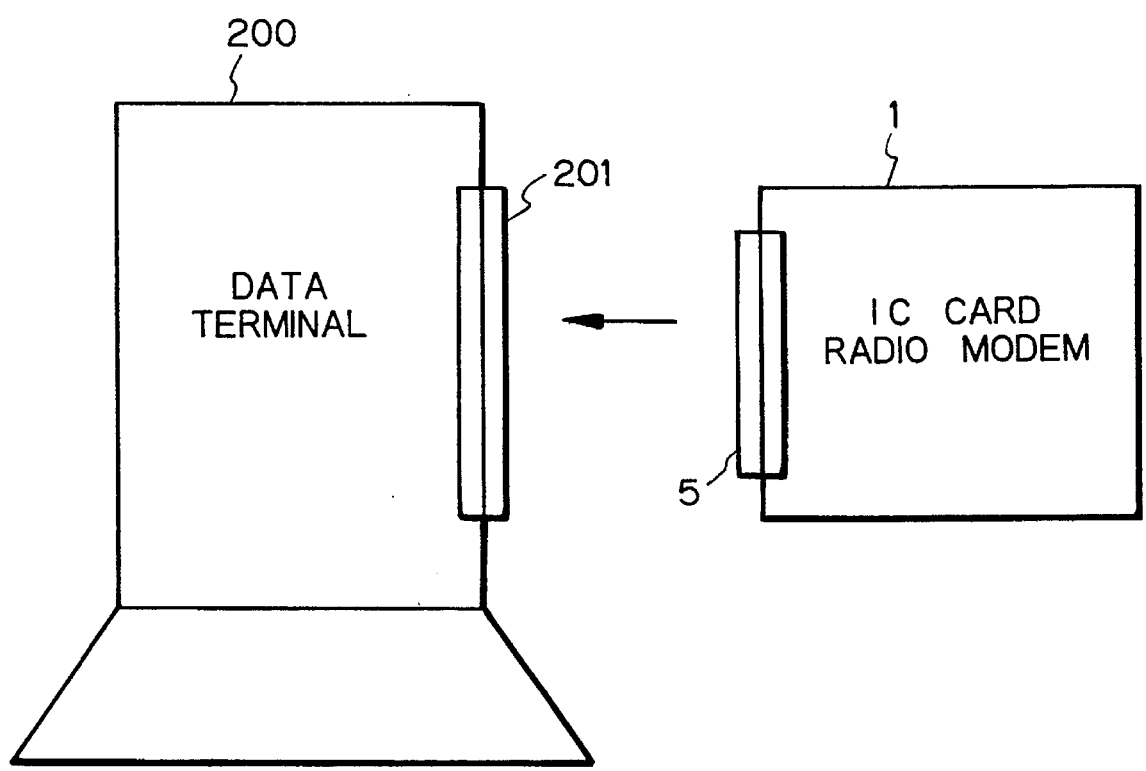
FIG. 3 is a view showing the connection of the radio modem of FIG. 2 to a data terminal.

Referring to FIG. 2, an IC card radio modem embodying the present invention will be described which eliminates the above problem. As shown, the modem, generally 1, is made up of an interface section 2, a control section 3, and a radio modem section 4. As shown in FIG. 3, the modem 1 is connected to a personal computer or similar data terminal 200 via a PCMCIA interface connector 5. Communication data are transferred from the data terminal 200 to the modem 1 and sent to a remote station via an antenna 6 mounted on the modem 1.

The interface section 2 has a CIS circuit 10, a PCMCIA interface circuit 20, n different kinds of communication interface circuits 30-1 to 30-n, and a switching circuit 40. The CIS circuit 10 is an attribute memory storing data representative of the functions, performance and other attributes of the modem 1. As shown in FIG. 4, the attributes of the interface circuits 30-1 to 30-n are stored in the CIS circuit 10 at respective addresses.

The PCMCIA interface circuit 20 interchanges data with the data terminal 200 according to the PCMCIA agreement, e.g., under control conditions prescribed as a PCMCIA interface. The interface circuit 20 executes a procedure preceding I/O (Input/Output) mode communication and including mode setting. Further, the interface circuit 20 receives from the data terminal 200 an index number S1 designating one of the communication interface circuits 30-1 to 30-n matching the specifications of the data terminal 200, writes the number S1 therein, and delivers a write-in signal S2 to the control section 3 to inform it of the writing of the number S1.

The communication interface circuits 30-1 to 30-n interchange data with the data terminal 200 during the course of I/O mode communication, and each has particular access conditions.

The switching circuit, or selector, 40, selects one of the communication interface circuits 30-1 to 30-n at a time. Specifically, in response to the select signal S3 from the control section 3, the selector 40 selects one of the interface circuits 30-1 to 30-n designated by the signal S3, and connects it to the modem section 4.

The control section 3 controls the entire modem 1. On receiving the write-in signal. S2 from the PCMCIA interface circuit 20, the control section 3 recognizes the writing of the index number S1 and delivers the select signal S3 to the switching circuit 40. In response, the switching circuit 40 selects one of the communication interface circuits 30-1 to 30-n, as stated previously.

The modem section 4 modulates communication data received from the switching circuit 40 and sends the modulated data via the antenna 6. Also, this section 4 demodulates communication data coming in through the antenna 6 and feeds the demodulated data to the switching circuit 40.

In operation, the PCMCIA interface connector 5 is inserted into a card slot 201 (see FIG. 3) formed in the data terminal 200. As a result, the modem 1 is started up. The data terminal 200 accesses the modem 1 and scans the attribute data of the communication interface circuits 30-1 to 30-n stored in the CIS circuit 10. If any one of the interface circuits 30-1 to 30-n matches the interface of the data terminal 200, the terminal 200 sends the index number S1 designating the matching interface circuit to the modem 1. For example, when the interface circuit 30-2 matches the interface of the data terminal 200, the index number S1 designates the interface circuit 30-2. On receiving the index number S1, the modem 1 writes it in the PCMCIA interface circuit 20 and delivers the write-in signal S2 to the control section 3.

The write-in signal S2 informs the control section 3 of the writing of the index number S1 in the PCMCIA interface circuit 20. Then, the control section 3 delivers the select signal S3 to the switching circuit 40 and causes it to select, for example, the communication interface circuit 30-2. As a circuit result, the switching circuit 40 connects the interface modem 1 30-2 to the modem section 4. In this condition, the enters into a communication mode. Data communication is held on the path extending between the data terminal 200 and the radio modem 1 via the communication interface circuit 30-2, switching circuit 40, and modem section 4.

While the above embodiment has concentrated on an IC card radio modem, the present invention is, of course, applicable to any other kind of modem.

In summary, in accordance with the present invention, a modem includes an interface section made up of a plurality of different communication interface circuits. One of the interface circuits is selected which matches a data terminal as to communication access conditions. The interface circuit selected is connected to a radio modem section also included in the modem. With this configuration, the modem of the present invention is connectable to various kinds of data terminals each having particular access conditions. The present invention, therefore, allows a person to make the most of mobile computing resources by using a data terminal located at a destination, e.g., a client's office. The mobile computing promotes smooth data management meeting radio data communication needs, i.e., "communication at any time and any place".

Various modifications will become possible for those skilled in the art after receiving the teachings of the present disclosure without departing from the scope thereof.

What is claimed is:

1. A radio modem for allowing data to be interchanged between remote data terminals, comprising:

an interface section connected to a first data terminal, and comprising a plurality of communication interface circuits each having particular communication access conditions; a CIS circuit playing the role of an attribute memory storing data representative of attributes of said plurality of communication interface circuits; and a PCMCIA interface circuit for storing an index number indicative of one of said plurality of communication interface circuits matching said first data terminal in specifications;

a radio modem section selectively connectable to any one of said plurality of communication interface circuits, and for selectively modulating or demodulating data to be interchanged between said first data terminal and a second data terminal; and a control section for selecting one of said plurality of communication interface circuits matching said first data terminal in communication access condition, and for connecting said one communication interface circuit to said radio modem section, said control section connecting, when said index number is written to said PCMCIA interface circuit, said one communication interface circuit designated by said index number to said radio modem section.

2. A radio modem as claimed in claim 1, wherein said interface section comprises a switching circuit for connecting said one communication interface circuit to said radio modem section while being controlled by said control section.

3. A radio modem as claimed in claim 1, wherein the attributes of said plurality of communication interface circuits include at least power source conditions and timings.

* * * * *

UNITED STATES PATENT AND TRADEMARK OFFICE
CERTIFICATE OF CORRECTION

PATENT NO. : 5,610,941
DATED : March 11, 1997
INVENTOR(S) : Masahiko Tanaka, et al.

It is certified that error appears in the above-indentified patent and that said Letters Patent is hereby corrected as shown below:

Column 2, lines 14-15: after "reference" delete -- - --

Column 3, line 8: after "signal" delete --.--

Column 3, line 39: before "result" delete --circuit--

Column 3, line 40: "modem 1" should read --circuit --

Column 3, line 42: before "enters" insert --modem 1--

Signed and Sealed this

Third Day of March, 1998

Attest:

BRUCE LEHMAN

Attesting Officer

Commissioner of Patents and Trademarks